US012763019B2

(12) United States Patent
Li et al.

(10) Patent No.: US 12,763,019 B2
(45) Date of Patent: Oct. 13, 2026

(54) DISPLAY DEVICE AND DRIVING METHOD THEREOF

(71) Applicant: WUHAN CHINA STAR OPTOELECTRONICS TECHNOLOGY CO., LTD., Wuhan (CN)

(72) Inventors: Mingyue Li, Wuhan (CN); Li Zhong, Wuhan (CN); Guowei Zha, Wuhan (CN); Chao Wang, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 19/026,535

(22) Filed: Jan. 17, 2025

(65) Prior Publication Data

US 2026/0065859 A1 Mar. 5, 2026

Related U.S. Application Data

(63) Continuation of application No. PCT/CN2024/117230, filed on Sep. 5, 2024.

(30) Foreign Application Priority Data

Aug. 27, 2024 (CN) ......................... 202411190993.3

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0852* (2013.01); *G09G 2310/08* (2013.01); *G09G 2320/0233* (2013.01)

(58) Field of Classification Search
CPC ............... G09G 3/3233; G09G 3/2007; G09G 2300/0852; G09G 2310/08; G09G 2320/0233
See application file for complete search history.

(56) References Cited

U.S. PATENT DOCUMENTS 11,783,766 B1 * 10/2023 Li ............................ G09G 3/32 345/55
2010/0013824 A1 1/2010 Kim et al.
(Continued)

FOREIGN PATENT DOCUMENTS

CN 217880811 U 11/2022
CN 115641813 A 1/2023
(Continued)

OTHER PUBLICATIONS

International Search Report in International application No. PCT/CN2024/117230, mailed on May 15, 2025.
(Continued)

*Primary Examiner* — Jeff Piziali
(74) *Attorney, Agent, or Firm* — PV IP PC; Christopher Ruprecht; Wei Te Chung

(57) ABSTRACT

The present disclosure provides a display device and a driving method thereof. The pixel driving circuit of the display device panel comprises a pulse amplitude modulation driving module and a pulse width modulation driving module. The pulse width modulation driving module includes a comparator, a plurality of transistors, and a capacitor. The comparator is configured to compare the voltage of the ramp signal and the voltage of the data signal and control the conduction state of the light-emitting device of the display panel. The driving method includes comparing a voltage of a ramp signal and a voltage of a data signal in a light-emitting phase to control a light emission time of a
(Continued)

light-emitting device. The present disclosure can improve the low grayscale display effect and improve the display uniformity.

8 Claims, 13 Drawing Sheets

(56) References Cited

U.S. PATENT DOCUMENTS

| | | | | |
|---|---|---|---|---|
| 2013/0099692 | A1* | 4/2013 | Chaji | G09G 3/3233<br>315/224 |
| 2021/0110759 | A1* | 4/2021 | Qin | G09G 3/3233 |
| 2022/0068197 | A1 | 3/2022 | Kawae et al. | |
| 2022/0199001 | A1* | 6/2022 | Kim | G09G 3/32 |
| 2022/0330401 | A1* | 10/2022 | Hashimoto | G09G 3/3233 |
| 2023/0197005 | A1* | 6/2023 | Kim | G09G 3/2014<br>345/214 |
| 2024/0194137 | A1* | 6/2024 | Kwon | G09G 3/3233 |
| 2025/0046268 | A1* | 2/2025 | Furuya | G09G 3/3688 |

FOREIGN PATENT DOCUMENTS

| | | |
|---|---|---|
| CN | 117612480 A | 2/2024 |
| CN | 117746781 A | 3/2024 |

OTHER PUBLICATIONS

Written Opinion of the International Search Authority in International application No. PCT/CN2024/117230, mailed on May 15, 2025.

* cited by examiner

DISPLAY DEVICE AND DRIVING METHOD THEREOF

CROSS-REFERENCE TO RELATED APPLICATIONS

The present application is a U.S. continuation of International Application No. PCT/CN2024/117230, filed on Sep. 5, 2024, which claims priority to and the benefit of Chinese Patent Application No. 202411190993.3, filed on Aug. 27, 2024. The disclosures of the aforementioned applications are incorporated herein by reference in their entireties.

TECHNICAL FIELD

The present disclosure relates to the field of display technology, and more particularly, to a display device and a driving method thereof.

BACKGROUND

In Micro-LED display technology, the pixel driving circuit plays a key role in display quality.

Traditional Micro-LED pixel driving circuits use Pulse Amplitude Modulation (PAM) driving methods, which switch between different grayscales by changing the magnitude of the current amplitude. However, such driving method can lead to mottling in the actual image display at low currents and low grayscales, resulting in poor display uniformity.

To address the shortcomings of pure PAM driving methods, the industry has introduced hybrid driving circuits of PAM and Pulse Width Modulation (PWM), referred to as PHM circuits. In PHM driving circuits, high grayscales use PAM circuits to adjust the current for switching grayscales, while low grayscales use PWM circuits to adjust the light emission time for switching grayscales. Such hybrid driving method has improved the display effect to some extent.

However, traditional PHM driving circuits still have some issues in PWM driving mode. The main manifestation is that during the transition from dark to bright, the transition time from the dark state to the bright state (i.e., the rising edge time) is relatively long, which leads to a reduction in actual light emission time. Since the rising edge time may vary at different grayscales, this phenomenon affects the uniformity of the display, especially at low grayscales.

In addition, traditional PHM driving circuits still struggle to completely solve the problem of mottling in the displayed images at low grayscales, which further affects the uniformity of the display.

Therefore, how to further optimize the PWM circuit module on the basis of PHM driving circuits, shorten the rising edge time during the dark-bright transition process, improve the precise control of actual light emission time, and how to effectively improve the display uniformity at low grayscales, have become urgent technical challenges to be solved in the field of current Micro-LED display technology.

SUMMARY

Embodiments of the present disclosure provide a display device and a driving method thereof, aiming at improving display uniformity of the display device at low grayscales.

An embodiment of the present disclosure provides a display device including a plurality of pixel cells, each pixel cell including a light-emitting device; and a pixel driving circuit including a pulse width modulation module and a pulse amplitude modulation module; where the pulse width modulation module includes a comparator, a first transistor, a second transistor, a fourth transistor, a sixth transistor, and a first capacitor; the comparator is electrically connected to a high-level signal input terminal, a first node, a second node, and a low-level signal input terminal of the pulse width modulation module; a gate of the first transistor is electrically connected to a first light-emitting control signal input terminal, one of a source and a drain of the first transistor is electrically connected to a first ramp signal input terminal, and another of the source and the drain of the first transistor is electrically connected to a third node; a gate of the second transistor is electrically connected to a second pulse width modulation signal input terminal, one of a source and a drain of the second transistor is electrically connected to a first data signal input terminal, and another of the source and the drain of the second transistor is electrically connected to the third node; a first plate of the first capacitor is electrically connected to the second node, and a second plate of the first capacitor is electrically connected to the third node; a gate of the fourth transistor is electrically connected to a first pulse width modulation signal input terminal or the second pulse width modulation signal input terminal, one of a source and a drain of the fourth transistor is electrically connected to the first node, and another of the source and the drain of the fourth transistor is electrically connected to the second node; a gate of the sixth transistor is electrically connected to the first node, one of a source and a drain of the sixth transistor is electrically connected to a first power supply signal input terminal, and another of the source and the drain of the sixth transistor is electrically connected to the pulse amplitude modulation module.

An embodiment of the present disclosure further provides a driving method of a display device, the driving method including the steps of: inputting a low-level signal through an input terminal of the first pulse width modulation signal input terminal during a reset phase so that potentials of both the first node and the second node are initial signal potentials; writing a first data signal to the third node through a first data signal input terminal during a data signal writing phase; turning on the first transistor by inputting a high-level signal through the first light-emitting control signal input terminal during a light-emitting phase, under a condition that a voltage of the ramp signal is greater than a voltage of the first data signal, the comparator outputs a low-level signal, the sixth transistor is turned on, and the light-emitting device emits light; under a condition that the voltage of the ramp signal is less than the voltage of the first data signal, the comparator outputs a high-level signal, the sixth transistor is turned off, and the light-emitting device stops emitting light.

According to the technical solution of the present disclosure, by optimizing the pulse width modulation module, the display uniformity of the display device at a low grayscale is significantly improved. In particular, the present disclosure incorporates a comparator in the pulse width modulation module to achieve accurate control of the dimming switching process of the light-emitting device. Specifically, the comparator is configured to compare the voltage of the ramp signal with the voltage of the first data signal, and control the conduction state of the light-emitting device in time according to the comparison result, thereby significantly shortening the switching time from the dark state to the bright state, that is, the rising edge time of the light-emitting device. Compared with the conventional PHM driving circuit, the technical solution of the present disclosure optimizes the rising edge time from about 1 millisecond to about 0.1 millisecond, and the optimization effect reaches about 90%. The reduction in the rising edge time directly increases the actual light emission time of the light-emitting device, thereby improving the brightness utilization rate of the display device. At the same time, since the rising edge times under each grayscale are more uniform, the uniformity of the images displayed by the display device is significantly improved.

In addition, a duty cycle control module is added to the pulse width modulation module. By selectively outputting ramp signals of different slopes, the module realizes flexible adjustment of the light-emitting duty cycle. This technical solution is particularly applicable to a low-grayscale display scene, and by adjusting the light-emitting duty cycle at the low-grayscale, the problem of mottling caused by the defects of the light-emitting device itself is effectively improved. Compared with the conventional PHM driving circuit, the uniformity of images displayed at a low grayscale in the present disclosure is further improved.

BRIEF DESCRIPTION OF THE DRAWINGS

FIG. 13(*b*) is a timing diagram of the pixel cell shown in FIG. 12 at a low grayscale.

DETAILED DESCRIPTION

The following provides a detailed description of the specific implementations of the present disclosure in conjunction with the accompanying drawings.

The terms "first," "second," and similar terms do not denote any order, quantity, or importance, but are used to distinguish different technical features. The term "a plurality of" and similar terms indicate two or more, unless otherwise specifically limited.

The embodiments of the present disclosure may be combined with each other.

In the conventional hybrid pulse amplitude modulation and pulse width modulation driving circuit, the time for switching the light-emitting device from the dark state to the bright state can be up to 1 millisecond or more, which greatly affects the actual light emission time proportion of the light-emitting device. Fluctuations in the time at which light-emitting devices switch from the dark state to the bright state at different gray levels may cause problems of uneven display.

The present disclosure optimizes the pulse width modulation module 101 in view of the problem that the time for switching the light-emitting device from the dark state to the bright state is excessively long in the conventional pulse amplitude modulation and pulse width modulation hybrid driving circuit. The present disclosure can shorten the light/dark switching time of the light-emitting device and significantly improve the response speed of switching the light-emitting device from the dark state to the bright state.

Further, in order to further improve the problem of the occurrence of the spot on the low-grayscale display device, the pulse width modulation module 101 is further optimized in the present disclosure, and the duty cycle control module is added, thereby effectively improving the problem of the occurrence of the spot on the screen displayed on the low-grayscale display device.

Figure 1:
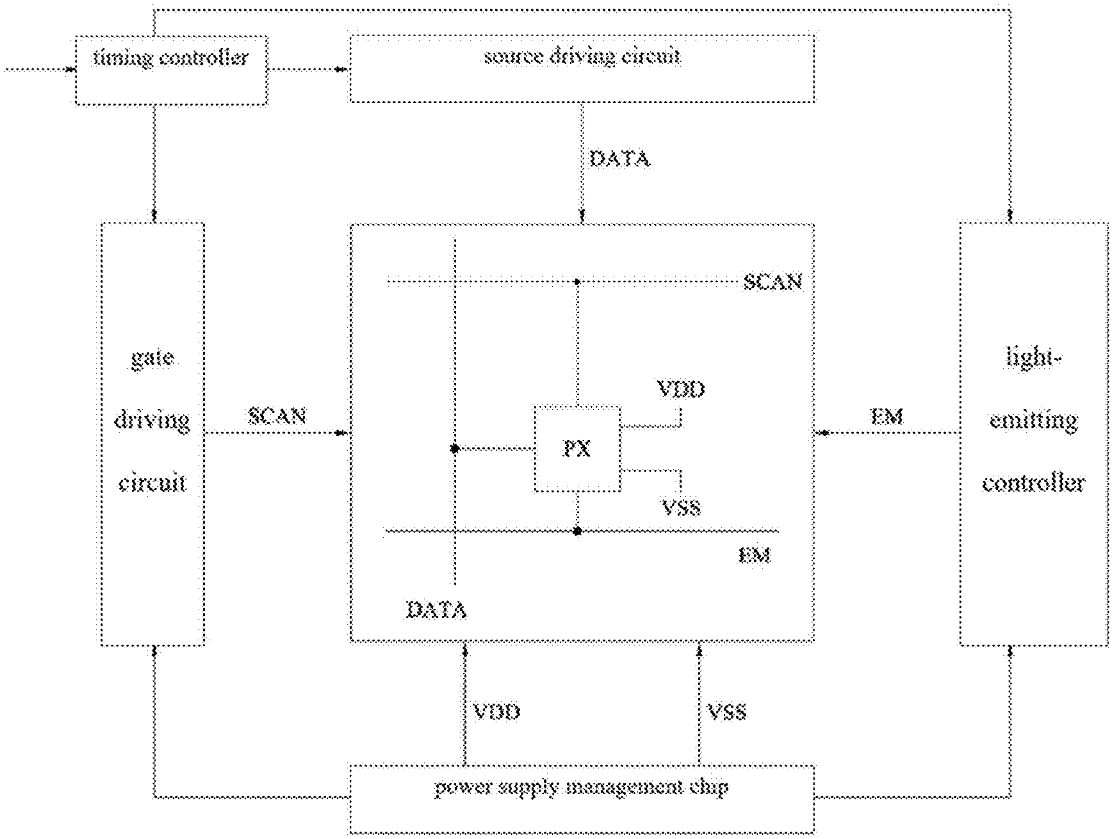
FIG. 1 is a schematic diagram of a display device according to the present disclosure.
Figure 2:
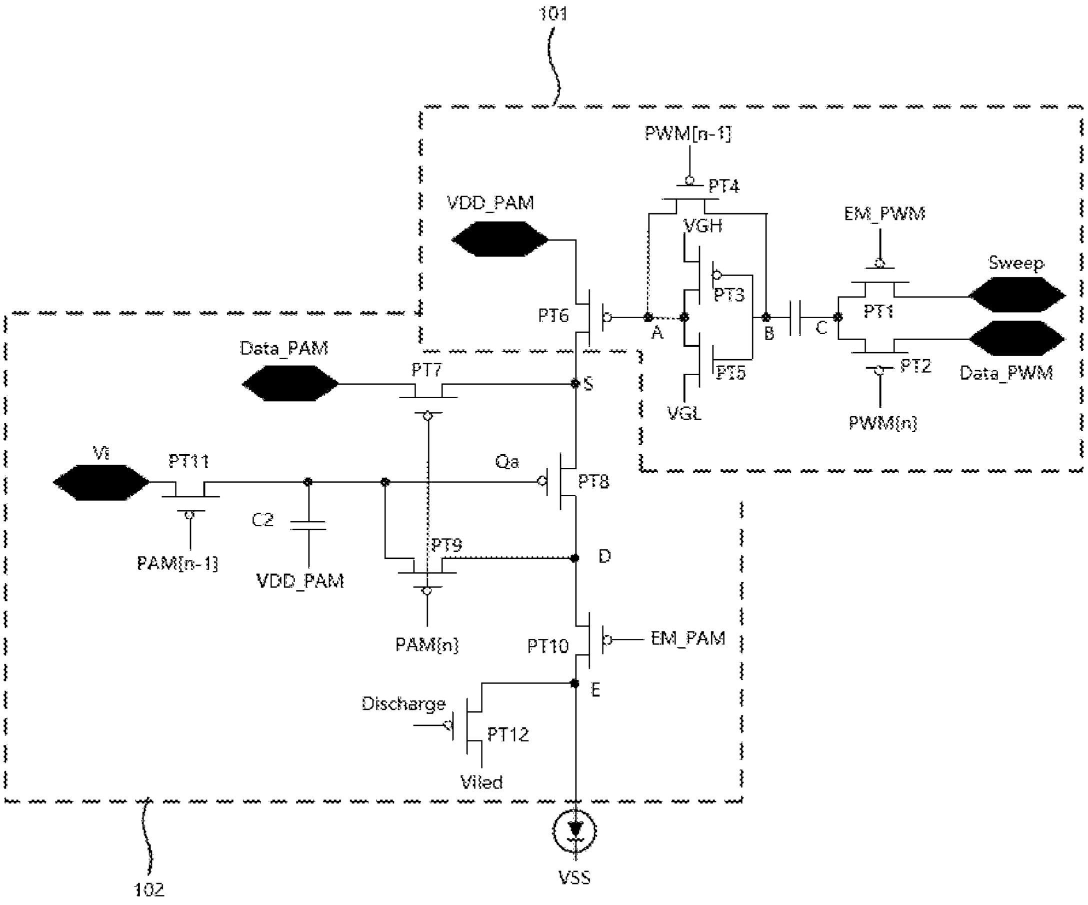
FIG. 2 is a circuit diagram of a pixel cell of a first embodiment of a display device according to the present disclosure.
Figure 3:
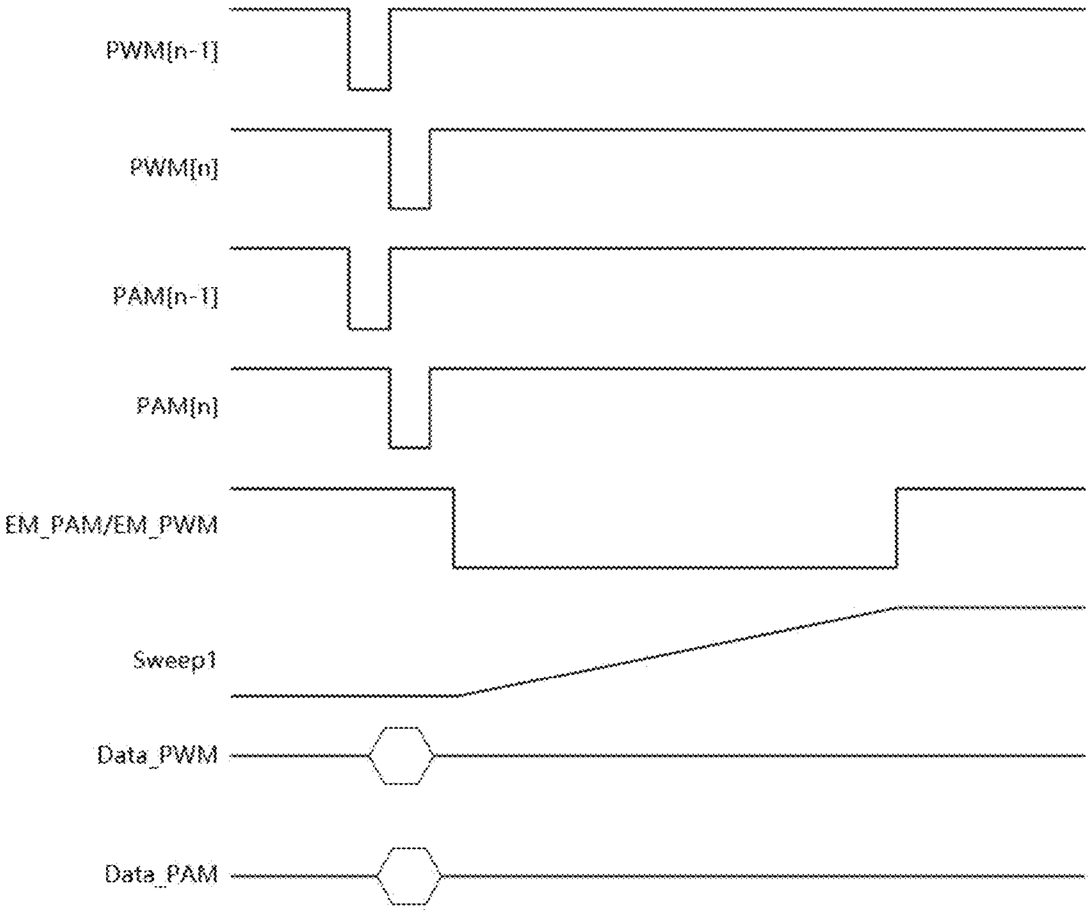
FIG. 3 is a timing diagram of the pixel cell shown in FIG. 2.

As shown in FIG. 1, the display device of the embodiment of the present disclosure may be, for example, an OLED display device, an Mini-LED display device, or an Micro-LED display device, which includes a gate driving circuit, a source driving circuit, a timing controller, a light-emitting controller, a power supply management chip, a substrate, a data line DATA, a scanning line SCAN, a power supply line (VDD, VSS), a light-emitting control signal line EM, a pixel array, an encapsulation layer, a polarizer, a color filter, and the like.

The substrate may be, for example, a glass substrate, a flexible substrate (e.g., a polyimide substrate), or the like. The pixel array is composed of a plurality of pixel cells PX arranged in rows and columns, and each pixel cell PX includes a light-emitting device and a pixel driving circuit. The pixel driving circuit includes a TFT device, the light-emitting device is electrically connected to the pixel driving circuit, the light-emitting device includes a light-emitting layer, an electron transport layer, a hole transport layer, a cathode, an anode, and the like, and different light-emitting layer materials may emit light of different wavelengths. The encapsulation layer includes an organic/inorganic alternating multilayer structure. The gate driving circuit is used for controlling the TFT device to gate the pixel cells PX, and each stage of the gate driving circuit correspondingly controls one row of the pixel cells PX. Each stage of the gate driving circuit is mainly composed of a thin film transistor (TFT) and a capacitor. The source driving circuit is configured to supply a data signal to the pixel cell PX. The timing controller is configured to receive externally input image data and a synchronization signal to generate signals required by the gate driving circuit and the source driving circuit. The power supply management chip is configured to supply the required operating voltage to various parts of the display device.

In addition, the display device of the present disclosure may further integrate an embedded touch circuit, which is electrically connected to a timing controller, and implement a touch function and a display function in a time division multiplexing manner.

The present disclosure provides a new hybrid drive circuit for pulse amplitude modulation and pulse width modulation. A comparator is added to the pulse width modulation module 101, thereby reducing the dark switching time of the circuit. The circuit of the present disclosure operates as follows.

First Embodiment

As shown in FIGS. 2, 3, 4, and 5, the pulse width modulation module 101 of the present embodiment includes a comparator, a first transistor PT1, a second transistor PT2, a fourth transistor PT4, a sixth transistor PT6, and a first capacitor C1. The first transistor PT1, the second transistor PT2, the fourth transistor PT4, and the sixth transistor PT6 are all P-type transistors.

The comparator consists of a third transistor PT3 and a fifth transistor PT5. The third transistor PT3 is a P-type transistor, and the fifth transistor PT5 is an N-type transistor. The gates of the third transistor PT3 and the fifth transistor PT5 are electrically connected. One of the source and the drain of the third transistor PT3 is electrically connected to the high-level signal input terminal VGH, and the other of the source and the drain is electrically connected to the first node A. One of the source and the drain of the fifth transistor PT5 is electrically connected to the low-level signal input terminal VGL, and the other of the source and the drain is electrically connected to the first node A. When the third transistor PT3 is turned on, the fifth transistor PT5 is turned off; when the third transistor PT3 is turned off, the fifth transistor PT5 is turned on.

The gate of the first transistor PT1 is electrically connected to the first light-emitting control signal input terminal EM_PWM1, one of the source and the drain is electrically connected to the first ramp signal input terminal Sweep1, and the other of the source and the drain is electrically connected to the third node C.

The gate of the second transistor PT2 is electrically connected to the second pulse width modulation signal input terminal PWM[n], one of the source and the drain is electrically connected to the first data signal input terminal Data_PWM, and the other of the source and the drain is electrically connected to the third node C.

One terminal of the first capacitor C1 is electrically connected to the second node B, and the other terminal is electrically connected to the third node C.

The gate of the fourth transistor PT4 is electrically connected to the first pulse width modulation signal input terminal PWM[n−1], one of the source and the drain is electrically connected to the first node A. The other of the source and the drain is electrically connected to the second node B.

The gate of the sixth transistor PT6 is electrically connected to the first node A. One of the source and the drain is electrically connected to the first power supply signal input terminal VDD_PAM, and the other of the source and the drain is electrically connected to the pulse amplitude modulation module 102.

The pulse amplitude modulation module 102 of the present disclosure includes a seventh transistor PT7, an eighth transistor PT8, a ninth transistor PT9, a tenth transistor PT10, an eleventh transistor PT11, and a twelfth transistor PT12. These transistors are all P-type transistors.

The gate of the seventh transistor PT7 is electrically connected to the second pulse amplitude modulation signal input terminal PAM[n], one of the source and the drain is electrically connected to the second data signal input terminal Data_PAM, and the other of the source and the drain is electrically connected to the source or the drain of the sixth transistor PT6.

One of the source and the drain of the eighth transistor PT8 is electrically connected to the source or the drain of the sixth transistor PT6, and the other of the source and the drain is electrically connected to the fourth node D.

The gate of the ninth transistor PT9 is electrically connected to the second pulse amplitude modulation signal input terminal PAM[n], one of the source and drain is electrically connected to the gate of the eighth transistor PT8, and the other of the source and drain is electrically connected to the fourth node D.

The gate of the tenth transistor PT10 is electrically connected to the third light-emitting control signal input terminal EM_PAM, one of the source and the drain is electrically connected to the fourth node D, and the other of the source and the drain is electrically connected to the anode of the light-emitting device.

The cathode of the light-emitting device is electrically connected to the second power supply signal input terminal VSS.

The gate of the eleventh transistor PT11 is electrically connected to the first pulse amplitude modulation signal input terminal PAM[n−1], one of the source and the drain is electrically connected to the reset signal input terminal Vi, and the other of the source and the drain is electrically connected to the gate of the eighth transistor PT8.

The gate of the twelfth transistor PT12 is electrically connected to the reset control signal input terminal Discharge, one of the source and the drain is electrically connected to the reset signal input terminal Viled of the anode of the light-emitting device, and the other of the source and the drain is electrically connected to the anode of the light-emitting device.

The operation phase of the pixel driving circuit of the present disclosure includes three phases: a reset phase, a data signal writing phase, and a light-emitting phase.

In the reset phase, the first pulse width modulation signal input terminal PWM[n−1] inputs a low-level signal so that the potentials of both the first node A and the second node B are equal to the initial signal potential Vcm. The first pulse amplitude modulation signal input terminal PAM[n−1] inputs a low-level signal, the eleventh transistor PT11 is turned on, the reset signal input terminal Vi writes a low level to the gate of the eighth transistor PT8 (driving transistor) through the eleventh transistor PT11, resets the node Qa, and the reset control signal input terminal Discharge inputs a low-level signal, the twelfth transistor PT12 is turned on, and the reset signal input terminal Viled resets the anode of the light-emitting device through the twelfth transistor PT12.

In the data signal writing phase, the first data signal input terminal Data_PWM writes the potential Vdata_pwm to the third node C. At this time, the first capacitor C1 stores the voltage difference between Vdata_pwm and Vcm. The second pulse amplitude modulation signal input terminal PAM [n] inputs a low-level signal, the seventh transistor PT7 and the ninth transistor PT9 are turned on, and the data signal of the second data signal input terminal Data_PAM is written to the gate of the eighth transistor PT8 to compensate the threshold voltage of the eighth transistor PT8.

In the light-emitting phase, the first transistor PT1 is turned on, and a ramp signal is input to the first ramp signal input terminal Sweep1. The ramp signal is used to compare with the first data signal to determine the light-emitting duty cycle of the circuit (the light emission time ratio of the light-emitting device in the period of one frame of picture). The voltage of the ramp signal gradually changes. The third light-emitting control signal input terminal EM_PAM inputs a low-level signal, the tenth transistor PT10 is turned on, the current supplied from the first power supply signal input terminal VDD_PAM flows through the light-emitting device, and the light-emitting device starts to emit light.

When the voltage Vsweep of the ramp signal is greater than the voltage Vdata_pwm of the first data signal, the comparator (including the third transistor PT3 and the fifth transistor PT5) outputs a low-level signal. This causes the potential of the first node A to become larger than Vcm through the first capacitor C1, causing the sixth transistor PT6 to turn on, and the light-emitting device starts to emit light.

When the voltage Vsweep of the ramp signal is smaller than the voltage Vdata_pwm of the first data signal, the comparator outputs a high-level signal to turn off the sixth transistor PT6, and the light-emitting device stops emitting light.

In this embodiment, the third light-emitting control signal input from the third light-emitting control signal input terminal EM_PAM and the first light-emitting control signal input from the first light-emitting control signal input terminal EM_PWM1 and the second light-emitting control signal input from the second light-emitting control signal input terminal EM_PWM2 may be the same signal or different signals.

Figure 4:
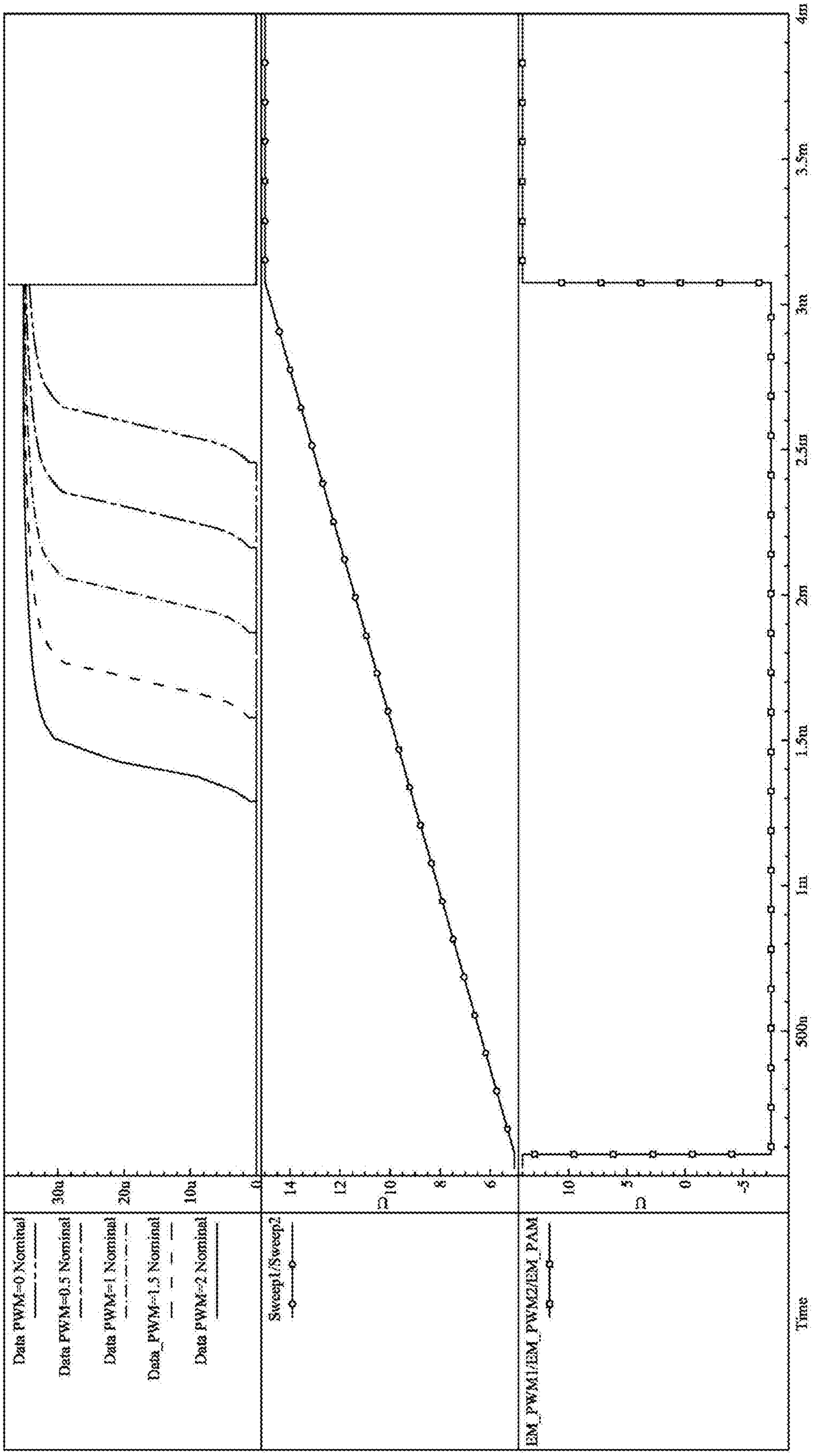
FIG. 4 is a simulation diagram of the light/dark switching speed of the light-emitting device in the pixel cell shown in FIG. 2.

As shown in FIG. 4, FIG. 4 is divided into upper, middle, and lower portions. The upper part of the graph shows the waveform of the current signal flowing through the light-emitting device at different gray levels (represented by different colors), the middle part of the graph shows the waveform of the ramp signal, and the lower part of the graph shows the waveform of the light-emitting control signal. It can be observed from the graph in the upper part that the rising edge time of each waveform is about 0.1 millisecond.

Figure 5:
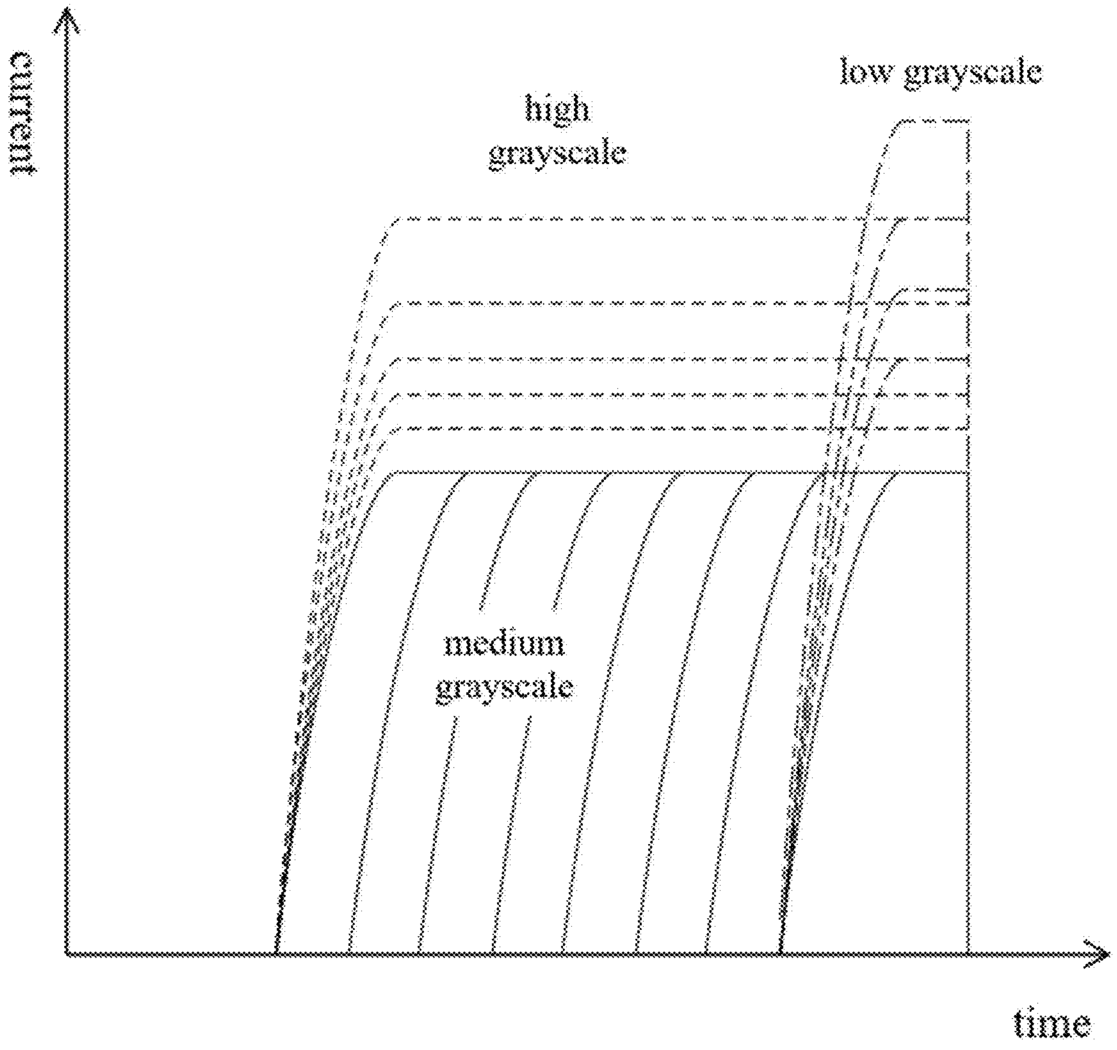
FIG. 5 is a schematic diagram of a driving mode of a pixel driving circuit in the pixel cell shown in FIG. 2.

As shown in FIG. 5, the graph shows waveforms of a plurality of different grayscales in a high grayscale range, a medium grayscale range, and a low grayscale range. The display effect of the grayscale is determined by the current and time (i.e., the duration of the light emission) together.

The high grayscale range may be, for example, 200-255. Within this range, the time (duty cycle) of the waveform remains unchanged, while the current values are different. This means that the display between different gray levels in the high grayscale range is achieved by adjusting the magnitude of the current.

The medium grayscale range may be, for example, 100-199. Within this range, the current value (peak value of the current) of the waveform remains unchanged, and the time is different. This indicates that the display between different grayscales in the medium grayscale range is achieved by adjusting the emission time.

The low grayscale range may be, for example, 0-99. Within this range, a shorter time (duty cycle) is selected and a relatively high current is used to drive the light-emitting device to emit light. This method can compensate for differences between different chips to some extent and improve the uniformity of the low grayscale display.

Second Embodiment

Figure 6:
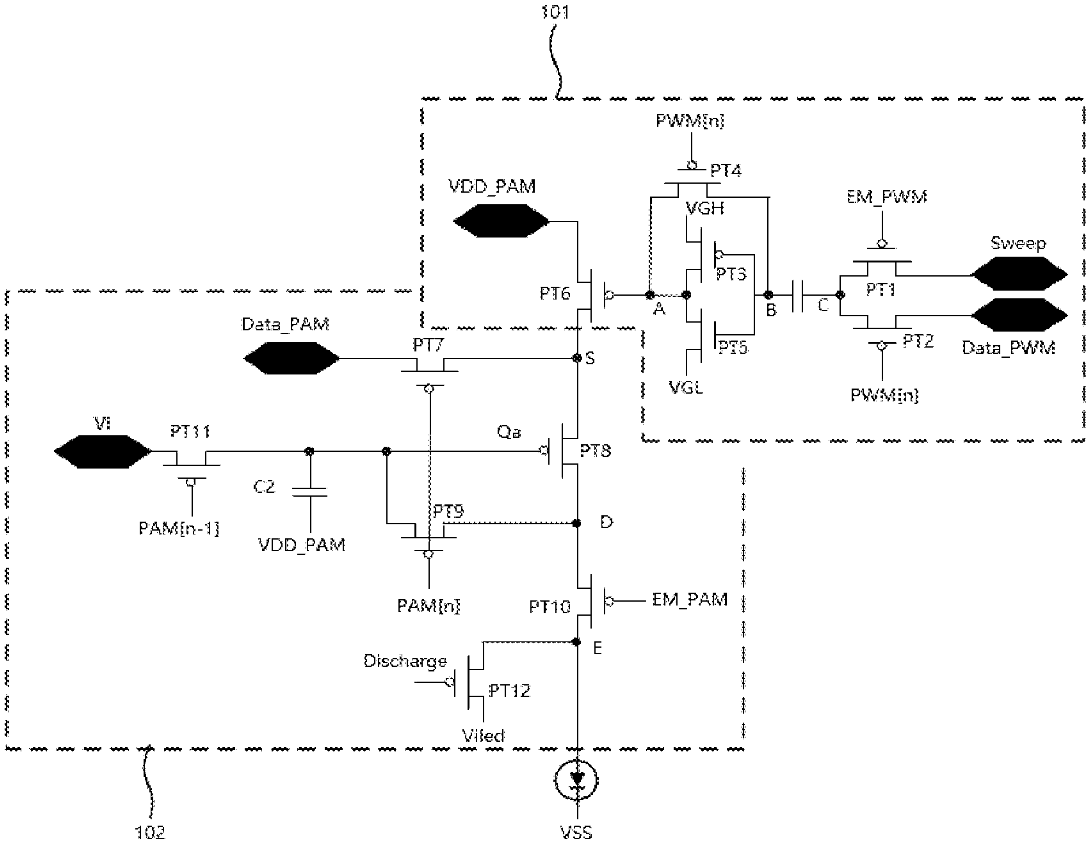
FIG. 6 is a circuit diagram of a pixel cell of a second embodiment of a display device according to the present disclosure.
Figure 7:
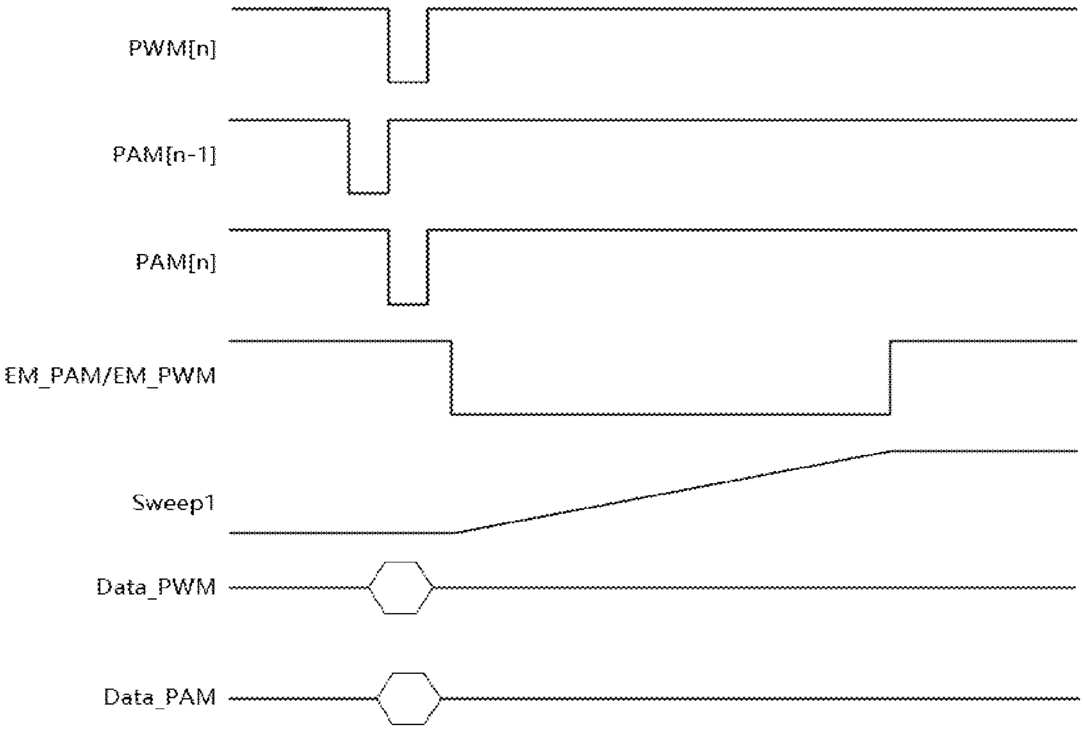
FIG. 7 is a timing diagram of the pixel cell shown in FIG. 6.

The main difference between the present embodiment and the first embodiment is the connection mode of the fourth transistor PT4. As shown in FIGS. 6 and 7, in the present embodiment, the gate of the fourth transistor PT4 is electrically connected to the second pulse width modulation signal input terminal PWM[n].

This embodiment optimizes the pulse width modulation module 101. When the second pulse width modulation signal input terminal PWM[n] inputs a low-level signal, the first data signal input terminal Data_PWM writes data to the third node C. At the same time, the fourth transistor PT4 is turned on so that the third node C directly controls the first node A after being charged through the first capacitor C1, thereby preventing the internal node of the circuit from being in the floating state.

Third Embodiment

The third embodiment is similar to the first embodiment except the following.

Figure 8:
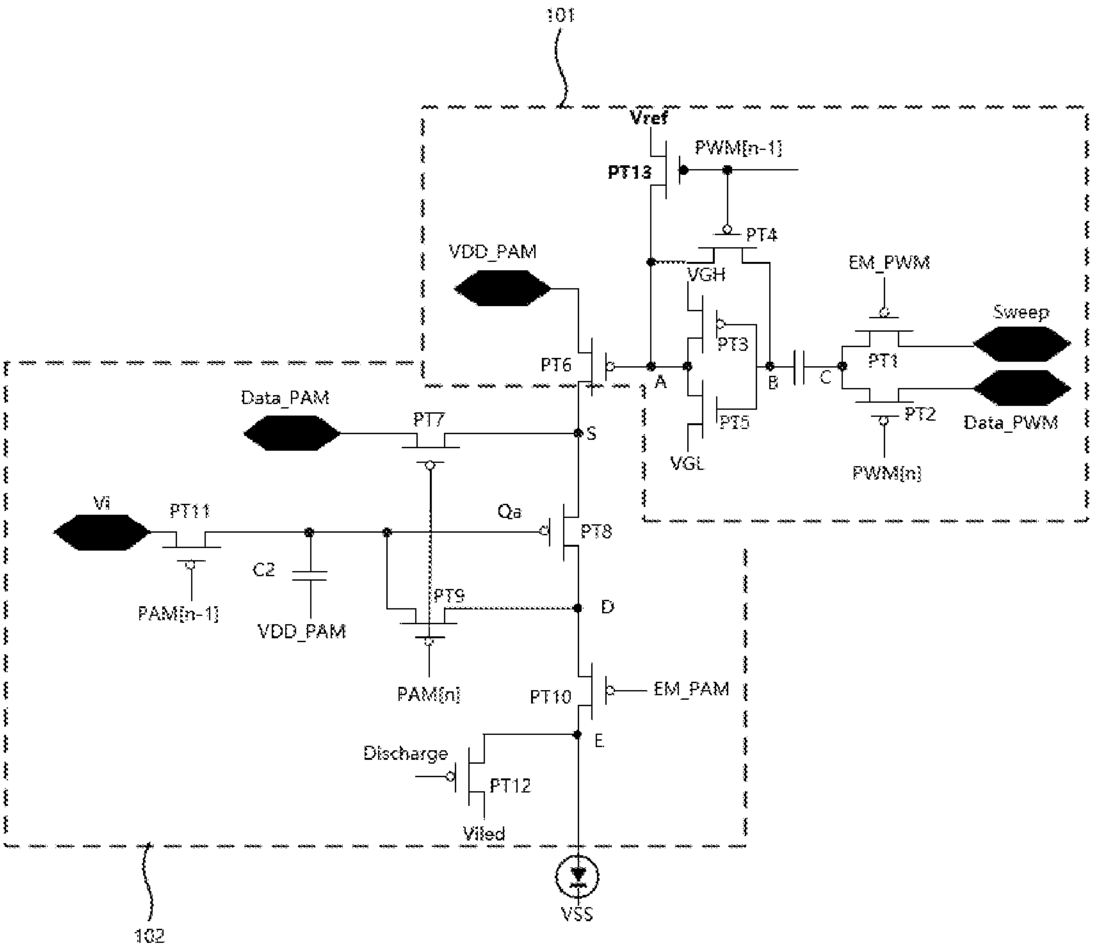
FIG. 8 is a circuit diagram of a pixel cell of a third embodiment of a display device according to the present disclosure.
Figure 9:
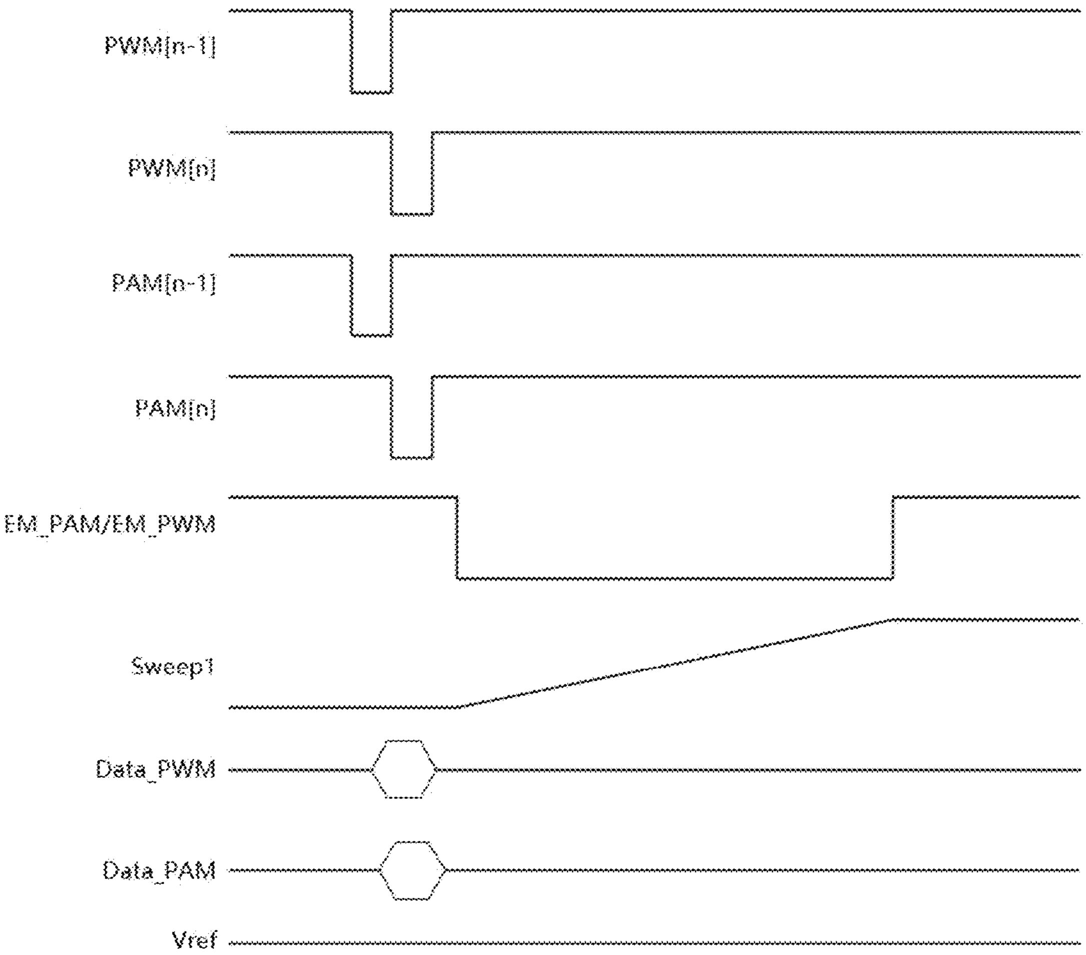
FIG. 9 is a timing diagram of the pixel cell shown in FIG. 8.

As shown in FIGS. 8 and 9, the thirteenth transistor PT13 is added to the first embodiment. The gate of the thirteenth transistor PT13 is electrically connected to the first pulse width modulation signal input terminal PWM[n−1], one of the source and drain is electrically connected to the reference voltage signal input terminal Vref, and the other of the source and drain is electrically connected to the first node A.

This improvement further reduces the likelihood that the internal nodes of the drive circuit will be in the floating state. When the first pulse width modulation signal input terminal PWM[n−1] inputs a low-level signal, the thirteenth transistor PT13 is turned on to reset the first node A. At the same time, the fourth transistor PT4 is turned on so that the voltage VA of the first node A is equal to the voltage VB of the second node B. Other operating states remain unchanged.

The pixel driving circuit of the present disclosure optimizes the time of switching the light-emitting device from the dark state to the bright state to about 0.1 milliseconds, and achieves an optimization effect of about 90% compared with 1 millisecond of the conventional circuit.

Fourth Embodiment

The fourth embodiment is similar to the first embodiment except the following.

In order to reduce the production cost and improve the process yield, the present embodiment optimizes the circuit. The main change is to change the N-type transistor in the comparator to a P-type transistor.

Figure 10:
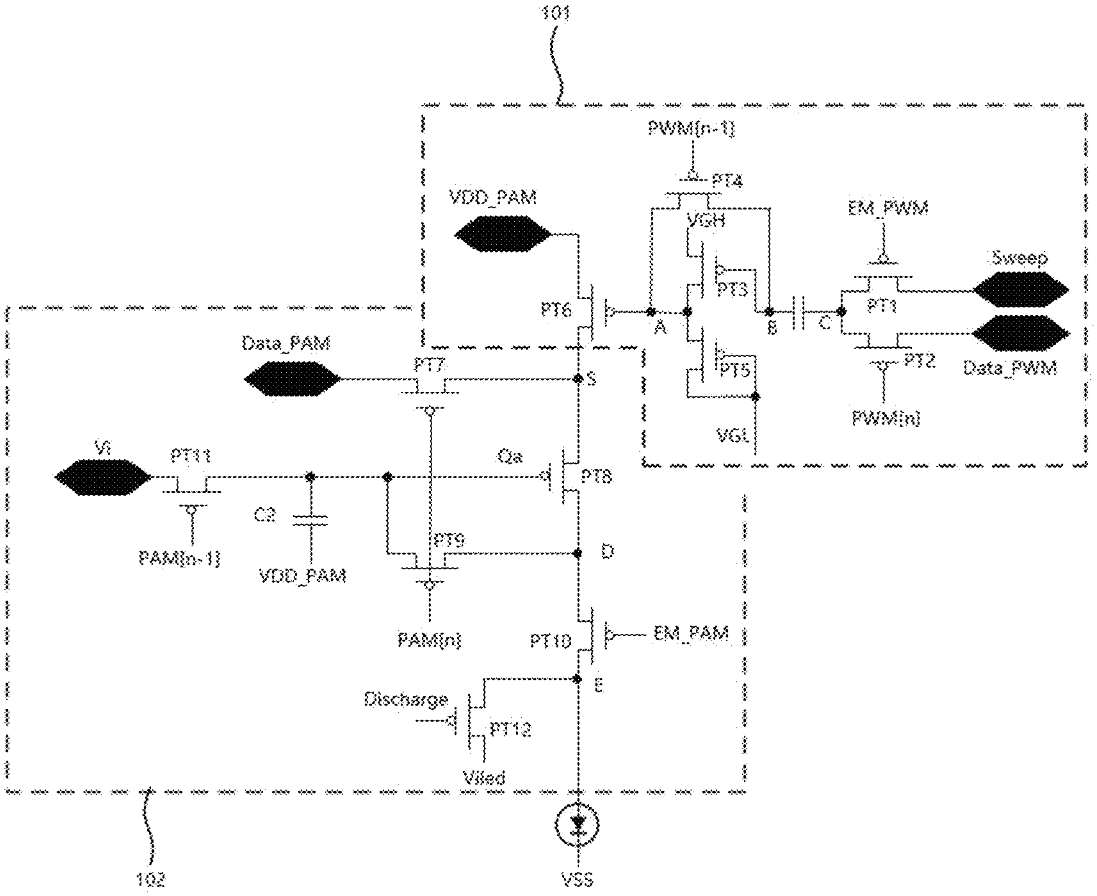
FIG. 10 is a circuit diagram of a pixel cell of a fourth embodiment of a display device according to the present disclosure.
Figure 11:
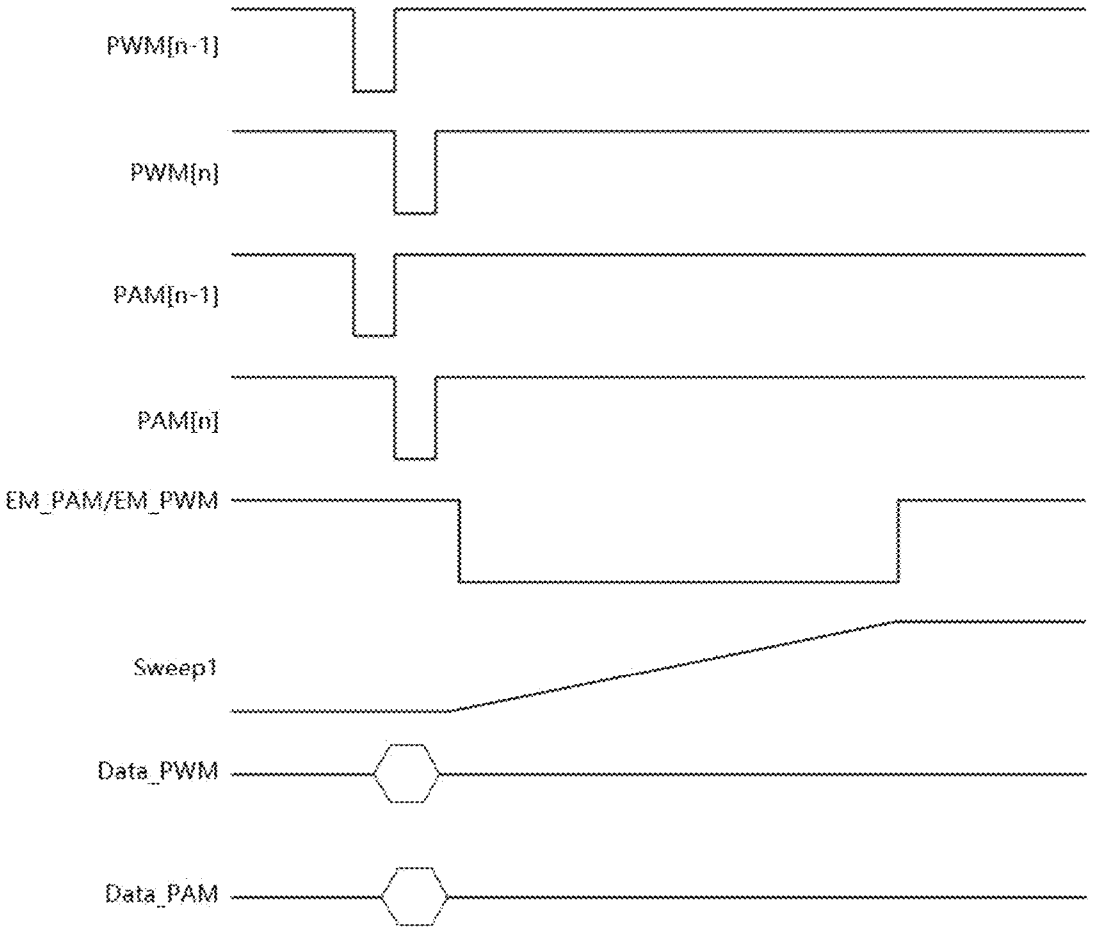
FIG. 11 is a timing diagram of the pixel cell shown in FIG. 10.

As shown in FIGS. 10 and 11, in the present embodiment, the third transistor PT3 and the fifth transistor PT5 of the comparator are both P-type transistors. The gate of the third transistor PT3 is still electrically connected to the second node B, but the gate of the fifth transistor PT5 is instead electrically connected to the low-level signal input terminal VGL.

Fifth Embodiment

The fifth embodiment is similar to the first embodiment except the following.

Figure 12:
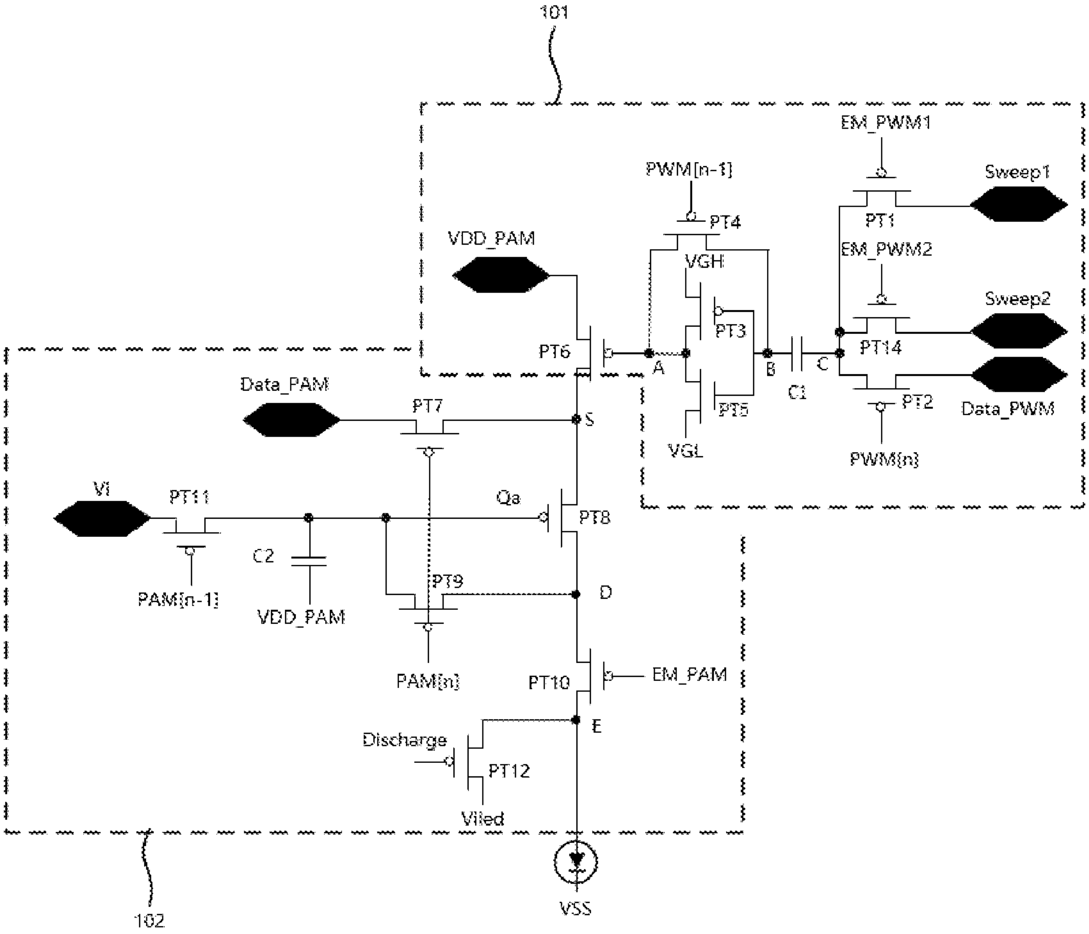
FIG. 12 is a circuit diagram of a pixel cell of a fifth embodiment of a display device according to the present disclosure.
Figure 13A:
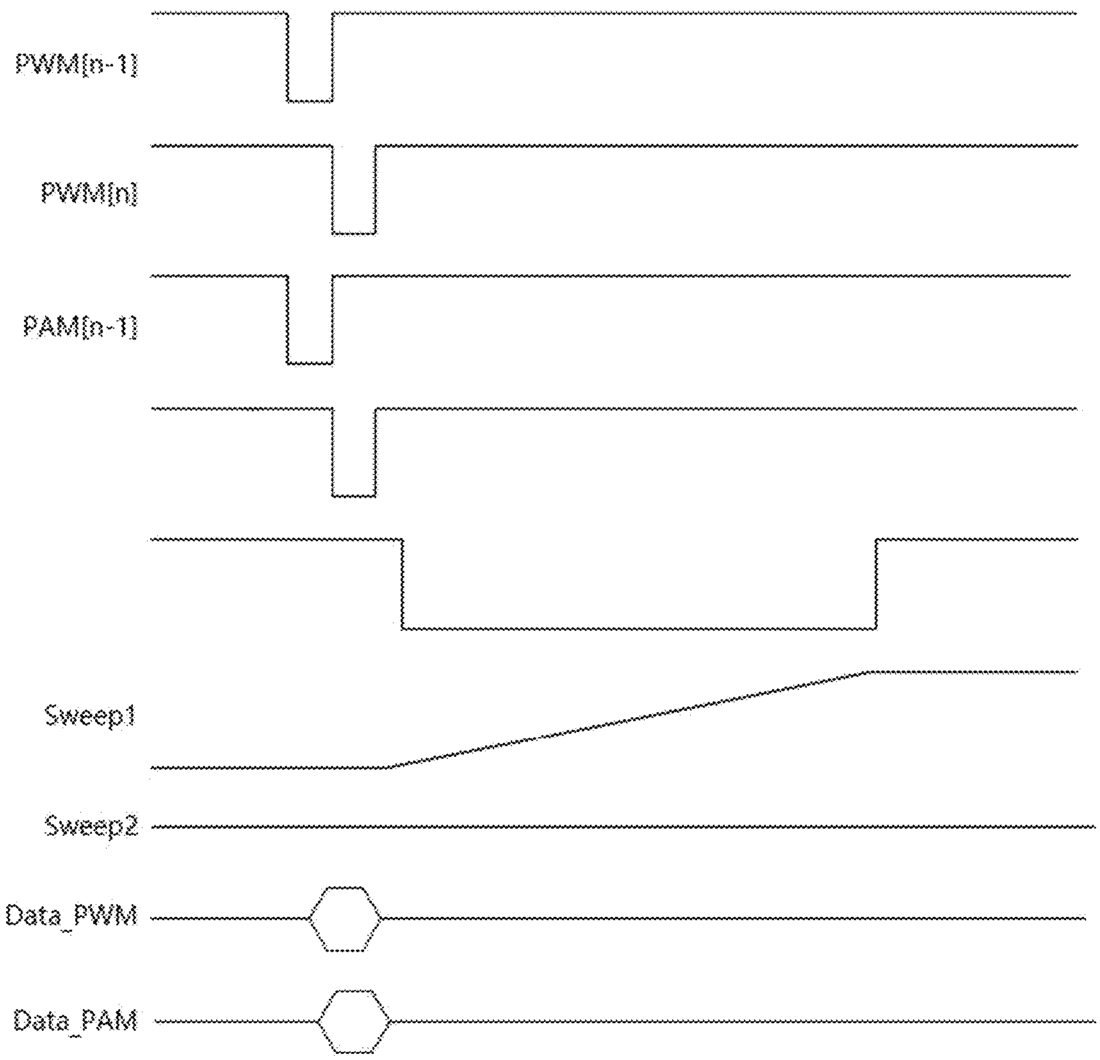
FIG. 13(*a*) is a timing diagram of the pixel cell shown in FIG. 12 at a high grayscale.
Figure 13B:
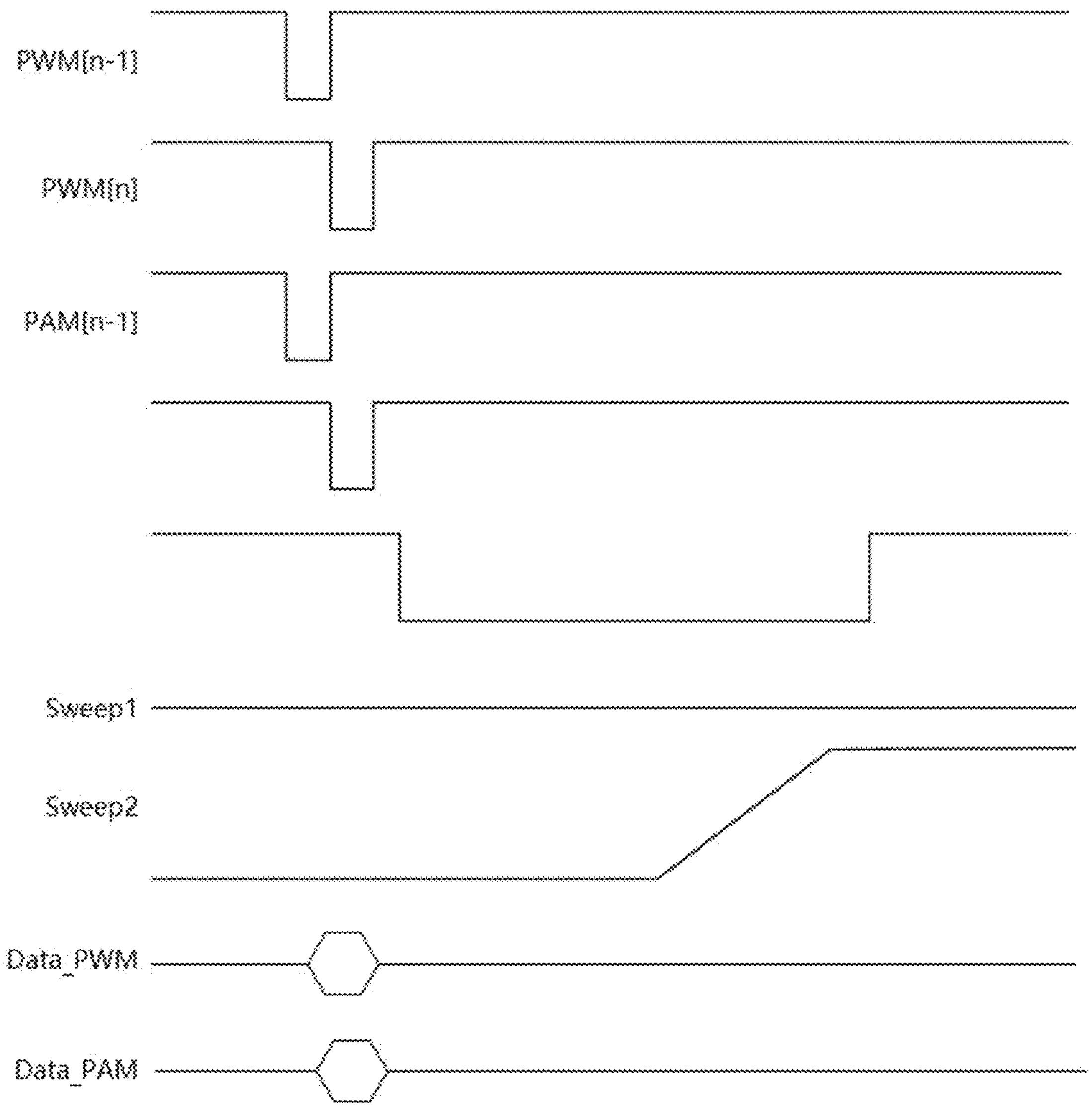

As shown in FIG. 12, FIG. 13(*a*), and FIG. 13(*b*), the duty cycle control module is added to the present embodiment to solve the problem that the low-grayscale display device may have a spot. This improvement helps to improve the uniformity problems caused by defects in the light-emitting device itself and the like, thereby improving the display effect.

At a low grayscale, the present embodiment improves the spot problem by further reducing the light emission duty cycle. In comparison with the first embodiment, the gate of the first transistor PT1 in the pulse width modulation module 101 of the present embodiment is electrically connected to the first light emission control signal input terminal EM_PWM1, and one of the source and the drain is electrically connected to the first ramp signal input terminal Sweep1.

In addition, a fourteenth transistor PT14 is added to the pulse width modulation module 101. The gate of the fourteenth transistor PT14 is electrically connected to the second light-emitting control signal input terminal EM_PWM2, one of the source and the drain is electrically connected to the second ramp signal input terminal Sweep2, and the other of the source and the drain is electrically connected to the third node C.

The first transistor PT1 and the fourteenth transistor PT14 together constitute a duty cycle control module for selectively outputting the first ramp signal or the second ramp signal to the third node C.

By optimizing the pulse width modulation module 101, the present disclosure improves the light/dark switching speed of the light-emitting device, improves the light emission lowering characteristic, improves the actual light emission duty cycle, and improves the display uniformity. By adding the duty cycle control module, the present disclosure further optimizes the pulse width modulation module 101, and effectively improves the problem of spot under low grayscale.

An embodiment of the present disclosure provides a display device including a plurality of pixel cells PX, each pixel cell PX including a light-emitting device and a pixel driving circuit, the light-emitting device and the pixel driving circuit being electrically connected, the pixel driving circuit including a pulse amplitude modulation module 102 and a pulse width modulation module 101.

The pulse width modulation module 101 includes a comparator, a first transistor PT1, a second transistor PT2, a fourth transistor PT4, a sixth transistor PT6, and a first capacitor C1.

The comparator is electrically connected to the high-level signal input terminal VGH, the first node A, the second node B, and the low-level signal input terminal VGL of the pulse width modulation module 101. Specifically, the comparator includes a third transistor PT3 and a fifth transistor PT5, one of the source and drain of the third transistor PT3 is electrically connected to the high-level signal input terminal VGH, the other of the source and drain of the third transistor PT3 is electrically connected to the first node A, the third transistor PT3 is electrically connected to the second node B, one of the source and drain of the fifth transistor PT5 is electrically connected to the low-level signal input terminal VGL, the other of the source and drain of the fifth transistor PT5 is electrically connected to the first node A, and the gate of the fifth transistor PT5 is electrically connected to the second node B or the low-level signal input terminal VGL.

The gate of the first transistor PT1 is electrically connected to the first light-emitting control signal input terminal EM_PWM1, one of the source and drain of the first transistor PT1 is electrically connected to the first ramp signal input terminal Sweep1, and the other of the source and drain of the first transistor PT1 is electrically connected to the third node C.

The gate of the second transistor PT2 is electrically connected to the second pulse width modulation signal input terminal PWM[n], one of the source and drain of the second transistor PT2 is electrically connected to the first data signal input terminal Data_PWM, and the other of the source and drain of the second transistor PT2 is electrically connected to the third node C.

The first plate of the first capacitor C1 is electrically connected to the second node B, and the second plate of the first capacitor C1 is electrically connected to the third node C.

The gate of the fourth transistor PT4 is electrically connected to the first pulse width modulation signal input terminal PWM[n−1] or the second pulse width modulation signal input terminal PWM[n], one of the source and drain of the fourth transistor PT4 is electrically connected to the first node A. The other of the source and drain of the fourth transistor PT4 is electrically connected to the second node B.

The gate of the sixth transistor PT6 is electrically connected to the first node A. One of the source and the drain of the sixth transistor PT6 is electrically connected to the first power supply signal input terminal VDD_PAM, and the other of the source and the drain of the sixth transistor PT6 is electrically connected to the pulse amplitude modulation module 102.

In the present embodiment, the first transistor PT1 and the second transistor PT2 are of a single-gate structure.

As an improvement, the first transistor PT1 and the second transistor PT2 are of a dual gate structure. Specifically, the back gates of the first transistor PT1 and the second transistor PT2 are connected to an adjustable voltage source. By adjusting the voltage of this voltage source, the threshold voltages of the first transistor PT1 and the second transistor PT2 can be controlled, thereby optimizing the switching characteristics of the first transistor PT1 and the second transistor PT2.

When the voltage of the ramp signal input terminals (Sweep1, Sweep2) is higher than the voltage of the first data signal input terminal Data_PWM, the third transistor PT3 is turned on and the fifth transistor PT5 is turned off. At this time, the high-level signal is transmitted to the first node A through the third transistor PT3. On the contrary, when the voltage of the ramp signal input terminals (Sweep1, Sweep2) is lower than the voltage of the first data signal input terminal Data_PWM, the third transistor PT3 is turned off, the fifth transistor PT5 is turned on, and the low-level signal is transmitted to the first node A. The embodiments of the present disclosure enable the comparator to complete state switching in a very short time (typically less than 1 microsecond), thereby greatly reducing the light/dark switching time of the light-emitting device.

In the duty cycle control module, the ramp signal input terminals (Sweep1, Sweep2) are electrically connected to the digital-to-analog converter (DAC), i.e., the ramp signal is generated by the digital-to-analog converter (DAC), so that more grayscales can be achieved.

When the display device displays a large-area dark picture, the slope of the ramp signal is lower than a predetermined value to prolong the display time of the low grayscale, thereby improving the display quality of the dark picture.

The pulse amplitude modulation module 102 includes a seventh transistor PT7, an eighth transistor PT8, a ninth transistor PT9, a tenth transistor PT10, an eleventh transistor PT11, and a twelfth transistor PT12.

The gate of the seventh transistor PT7 is electrically connected to the second pulse amplitude modulation signal input terminal PAM[n], one of the source and the drain of the seventh transistor PT7 is electrically connected to the second data signal input terminal Data_PAM, and the other of the source and the drain of the seventh transistor PT7 is electrically connected to the other of the source and the drain of the sixth transistor PT6.

One of the source and the drain of the eighth transistor PT8 is electrically connected to the other of the source and the drain of the sixth transistor PT6, and the other of the source and the drain of the eighth transistor PT8 is electrically connected to the fourth node D.

The gate of the ninth transistor PT9 is electrically connected to the second pulse amplitude modulation signal input terminal PAM[n], one of the source and drain of the ninth transistor PT9 is electrically connected to the gate of the eighth transistor PT8, and the other of the source and drain of the ninth transistor PT9 is electrically connected to the fourth node D.

The gate of the tenth transistor PT10 is electrically connected to the third light-emitting control signal input terminal EM_PAM, one of the source and drain of the tenth transistor PT10 is electrically connected to the fourth node D, and the other of the source and drain of the tenth transistor PT10 is electrically connected to the anode of the light-emitting device.

The gate of the eleventh transistor PT11 is electrically connected to the first pulse amplitude modulation signal input terminal PAM[n−1], one of the source and drain of the eleventh transistor PT11 is electrically connected to the reset signal input terminal Vi, and the other of the source and drain of the eleventh transistor PT11 is electrically connected to the gate of the eighth transistor PT8.

The gate of the twelfth transistor PT12 is electrically connected to the reset control signal input terminal Discharge, one of the source and the drain of the twelfth transistor PT12 is electrically connected to the reset signal input terminal Viled of the anode of the light-emitting device, and the other of the source and the drain of the twelfth transistor PT12 is electrically connected to the anode of the light-emitting device.

The first transistor PT1, the second transistor PT2, the third transistor PT3, the fourth transistor PT4, and the sixth transistor PT6 are all P-type transistors, the fifth transistor PT5 is N-type transistors, and the gate of the fifth transistor PT5 is electrically connected to the second node B.

The first transistor PT1, the second transistor PT2, the third transistor PT3, the fourth transistor PT4, the fifth transistor PT5, and the sixth transistor PT6 are all P-type transistors, and the gate of the fifth transistor PT5 is electrically connected to the low-level signal input terminal VGL.

The pulse width modulation module 101 further includes a thirteenth transistor PT13, the gate of which is electrically connected to the first pulse width modulation signal input terminal PWM[n−1], one of the source and drain of which is electrically connected to the reference voltage signal input terminal Vref, and the other of the source and drain of which is electrically connected to the first node A.

The pulse width modulation module 101 further includes a duty cycle control module including a first transistor PT1, the duty cycle control module further including a fourteenth transistor PT14, the gate of the fourteenth transistor PT14 being electrically connected to the second light-emitting control signal input terminal EM_PWM2, one of the source and the drain being electrically connected to the second ramp signal input terminal Sweep2, and the other of the source and the drain being electrically connected to the third node C.

Here, the first transistor PT1 and the fourteenth transistor PT14 are configured to selectively output the first ramp signal and the second ramp signal to the third node C.

The waveforms of the first ramp signal and the second ramp signal have different slopes.

The voltages of the first ramp signal and the second ramp signal vary linearly with time.

The pulse amplitude modulation module 102 is configured to switch the grayscale (controlling the display of different grayscales) by adjusting the current amplitude when the grayscale corresponding to the display data is within a second predetermined grayscale (high grayscale) range (above a predetermined threshold value). The pulse width modulation module 101 is configured to switch the grayscale (controlling the display of different grayscales) by adjusting the light emission time when the grayscale corresponding to the display data is within a first predetermined grayscale (low grayscale) range (below or equal to a predetermined threshold value).

The duty cycle control module is configured to reduce the light-emitting duty cycle (the proportion of the light emission time of the light-emitting device in the period of one frame of a picture) to improve the display uniformity when the grayscale corresponding to the display data is within a first predetermined grayscale (low grayscale) range (below or equal to a predetermined threshold value).

As an improvement, an inverter composed of two additional transistors is provided between the third transistor PT3 and the fifth transistor PT5. Adding the inverter can increase the switching speed of the comparator while reducing power consumption due to transient currents in the switching process of the transistor.

The first capacitor C1 functions as a coupling in this circuit, and the magnitude of its capacitance directly affects the response speed and stability of the circuit. Larger capacitance values may provide better noise suppression, but may also increase the response time of the circuit.

As an improvement, the first capacitor C1 is a variable capacitor. The variable capacitor is used for dynamically adjusting the capacitance value of the variable capacitor according to different display scenes. For example, in displaying a rapidly changing moving picture, the capacitance value of the variable capacitor decreases to increase the response speed; when a static or slowly changing picture is displayed, the capacitance value of the variable capacitor is increased to improve the anti-noise capability. Such a variable capacitor may be realized by switching between a plurality of fixed capacitors connected in parallel, the variable capacitor being controlled by a separate control circuit in its switching process.

As an improvement, the display device of the present disclosure further includes an image processing module and a driving control module.

The image processing module is configured to analyze the image data input to the display device, and calculate a grayscale value of each pixel, and a local average luminance of an area in which the pixel is located.

The drive control module is configured to generate a ramp signal, such as a first ramp signal (lower slope) and a second ramp signal (higher slope), for each pixel based on the grayscale value of each pixel and the local average brightness of the region in which the pixel is located provided by the image processing module, and to transmit the ramp signal to the duty cycle control module.

For example, if a low-grayscale pixel is surrounded by high-brightness pixels, the driving control module is configured to generate a ramp signal with a larger slope to control the light emission time of the light-emitting device to be shorter, thereby reducing the contrast with the surrounding high-brightness pixels, and making the image transition smoother.

The drive control module further includes the above-described digital-to-analog converter (DAC) and a programmable voltage generator including a plurality of capacitors and switches for generating ramp signals of different slopes and starting voltages by controlling the switches and capacitors.

The driving control module is configured to read a corresponding parameter from a predetermined look-up table (LUT) according to a current gray level of a pixel at the beginning of a period of each frame picture, and then generate a corresponding ramp signal through the digital-to-analog converter (DAC) and the programmable voltage generator.

The duty cycle control module is configured to selectively output a corresponding ramp signal based on the received light emission control signal and the ramp signal. If the first light emission control signal input terminal EM_PWM1 inputs a low-level signal, the first transistor PT1 turns on and outputs the first ramp signal (lower slope) to the third node C. If the second light emission control signal input terminal EM_PWM2 inputs a low-level signal, the fourteenth transistor PT14 turns on and outputs a second ramp signal (higher slope) to the third node C.

In the light-emitting phase, the pulse width modulation module 101 is configured to control the light emission time of the light-emitting device according to the ramp signal output to the third node C.

An embodiment of the present disclosure provides a display device for displaying a period of one frame of image including a reset phase, a data signal writing phase, and a light-emitting phase.

A driving method of a display device according to an embodiment of the present disclosure includes the following steps.

In the reset phase, a low-level signal is input through the first pulse width modulation signal input terminal PWM[n−1], so that the potentials of the first node A and the second node B are both initial signal potentials.

In the data signal writing phase, the first data signal is written to the third node C through the first data signal input terminal Data_PWM.

In the light-emitting phase, the first transistor PT1 is turned on by inputting a high-level signal through the first light-emitting control signal input terminal EM_PWM1. When the voltage of the ramp signal (the first ramp signal and the second ramp signal) is greater than the voltage of the first data signal, the comparator outputs a low-level signal, and the sixth transistor PT6 is turned on, so that the light-emitting device emits light. When the voltage of the ramp signal is smaller than the voltage of the first data signal, the comparator outputs a high-level signal, the sixth transistor PT6 is turned off, and the light-emitting device stops emitting light.

The driving method further includes:

In the reset phase, the thirteenth transistor PT13 is turned on by inputting a low-level signal through the first pulse width modulation signal input terminal PWM[n−1], and the first node A is reset.

The driving method further includes:

When the grayscale corresponding to the display data is within the first predetermined grayscale (low grayscale) range, the duty cycle control module selectively outputs the first ramp signal or the second ramp signal to the third node C to reduce the light emission duty cycle.

The voltages of the first ramp signal and the second ramp signal vary linearly with time.

The waveforms of the first ramp signal and the second ramp signal have different slopes for controlling different light emission duty cycles.

When the grayscale corresponding to the display data is in the range of the second predetermined grayscale (high grayscale) (above the predetermined threshold value), the pulse amplitude modulation module 102 switches the grayscale (controls the display of different grayscales) by adjusting the current amplitude.

When the grayscale corresponding to the display data is in the range of the first predetermined grayscale (low grayscale) (below or equal to the predetermined threshold value), the pulse width modulation module 101 switches the grayscale (controls the display of different grayscales) by adjusting the light emission time.

When the grayscale corresponding to the display data is within a first predetermined grayscale (low grayscale) range (below or equal to a predetermined threshold value), the duty cycle control module reduces the light emission duty cycle to improve the display uniformity.

As an improvement, the first capacitor C1 is a variable capacitor.

The driving method further includes:

The variable capacitor dynamically adjusts its capacitance value according to different display scenes. For example, in displaying a rapidly changing moving picture, the capacitance value of the variable capacitor decreases to increase the response speed; when a static or slowly changing picture is displayed, the capacitance value of the variable capacitor is increased to improve the anti-noise capability. Such a variable capacitor may be realized by switching between a plurality of fixed capacitors connected in parallel, the variable capacitor being controlled by a separate control circuit in its switching process.

As an improvement, the display device of the present disclosure further includes an image processing module and a driving control module.

The driving method further includes:

The image processing module analyzes the image data input to the display device, and calculates the grayscale value of each pixel and the local average luminance of the region in which the pixel is located.

The drive control module generates a ramp signal, such as a first ramp signal (lower slope) and a second ramp signal (higher slope), for each pixel based on the grayscale value of each pixel and the local average brightness of the region in which the pixel is located provided by the image processing module, and transmits the ramp signal to the duty cycle control module.

For example, if a low-grayscale pixel is surrounded by high-brightness pixels, the driving control module generates a ramp signal with a larger slope to control the light emission time of the light-emitting device to be shorter, thereby reducing the contrast with the surrounding high-brightness pixels, and making the image transition smoother.

The drive control module further includes the above-described digital-to-analog converter (DAC) and a programmable voltage generator including a plurality of capacitors and switches for generating ramp signals of different slopes and starting voltages by controlling the switches and capacitors.

The drive control module reads a corresponding parameter from a predetermined look-up table (LUT) according to the current gray level of the pixel at the beginning of the period of each frame picture, and then generates a corresponding ramp signal through the digital-to-analog converter (DAC) and the programmable voltage generator.

The duty cycle control module selectively outputs a corresponding ramp signal based on the received light emission control signal and the ramp signal. If the first light emission control signal input terminal EM_PWM1 inputs a low-level signal, the first transistor PT1 turns on and outputs the first ramp signal (lower slope) to the third node C. If the second light emission control signal input terminal EM_PWM2 inputs a low-level signal, the fourteenth transistor PT14 turns on and outputs a second ramp signal (higher slope) to the third node C.

In the light-emitting phase, the pulse width modulation module 101 controls the light emission time of the light-emitting device according to the ramp signal output to the third node C.

As shown in FIGS. 4 and 5, the technical solution of the present disclosure significantly improves the display uniformity of the display device at a low grayscale by optimizing the pulse width modulation module 101. In particular, the present disclosure introduces a comparator in the pulse width modulation module 101 to realize accurate control of the light-emitting device light/dark switching process. Specifically, the comparator is configured to compare the voltage of the ramp signal with the voltage of the first data signal, and control the conduction state of the light-emitting device in time according to the comparison result, thereby significantly shortening the switching time from the dark state to the bright state, that is, the rising edge time of the light-emitting device. As shown in FIG. 4, the graph of the upper part shows waveforms of current signals flowing through the light-emitting device at different gray levels. It can be observed that the rising edge time of each waveform is about 0.1 milliseconds.

Compared with the conventional PHM driving circuit, the technical solution of the present disclosure optimizes the rising edge time from about 1 millisecond to about 0.1 millisecond, and the optimization effect reaches about 90%. The reduction in the rising edge time directly increases the actual light emission time of the light-emitting device, thereby improving the brightness utilization rate of the display device. At the same time, since the rising edge times under each grayscale are more uniform, the uniformity of the screen displayed by the display device is significantly improved.

As shown in FIG. 5, the figure shows waveforms of a plurality of different grayscales within a high grayscale range (which may be, for example, 200-255), a medium grayscale range (which may be, for example, 100-199), and a low grayscale range (which may be, for example, 0-99). The display effect of the grayscale is determined by the current and the duration of the light emission.

In the high grayscale range, the time (duty cycle) of the waveform remains unchanged while the current values are different. This means that the display between different gray levels in the high grayscale range is achieved by adjusting the magnitude of the current.

In the medium grayscale range, the current value (peak value of the current) of the waveform remains unchanged while the time is different. This indicates that the display between different grayscales within the range of the medium grayscale is achieved by adjusting the emission time.

In the low grayscale range, a short time (duty cycle) is selected and a relatively high current is used to drive the light-emitting device to emit light. This method can compensate for differences between different chips to some extent and improve the uniformity of the low grayscale display.

In addition, a duty cycle control module is added to the pulse width modulation module 101. By selectively outputting ramp signals of different slopes, the module realizes flexible adjustment of the light-emitting duty cycle. This technical solution is particularly applicable to a low-grayscale display scene, and by adjusting the light-emitting duty cycle at the low-grayscale, the problem of the spot caused by the defects of the light-emitting device itself is effectively improved. Compared with the conventional PHM driving circuit, the uniformity of a picture displayed at a low grayscale in the present disclosure is further improved.

The embodiments of present disclosure have been described in detail above, and the contents of this specification should not be construed as limiting the scope of protection of present disclosure.

What is claimed is:

1. A display device comprising a plurality of pixel cells, each of the pixel cells comprising:

a light-emitting device; and a pixel driving circuit including a pulse width modulation module and a pulse amplitude modulation module;

wherein the pulse width modulation module comprises a comparator and a duty cycle control module, the duty cycle control module comprises a first transistor, and the pulse width modulation module further comprises a second transistor, a fourth transistor, a sixth transistor and a first capacitor;

the comparator is electrically connected to a first level signal input terminal, a first node, a second node and a second level signal input terminal of the pulse width modulation module;

a gate of the first transistor is electrically connected to a first light-emitting control signal input terminal, one of a source and a drain of the first transistor is electrically connected to a first ramp signal input terminal, and another of the source and the drain of the first transistor is electrically connected to a third node; the first ramp signal input terminal is configured to output a first ramp signal;

a gate of the second transistor is electrically connected to a second pulse width modulation signal input terminal, one of a source and a drain of the second transistor is electrically connected to a first data signal input terminal, and another of the source and the drain of the second transistor is electrically connected to the third node;

a first plate of the first capacitor is electrically connected to the second node, and a second plate of the first capacitor is electrically connected to the third node;

a gate of the fourth transistor is electrically connected to a first pulse width modulation signal input terminal or to the second pulse width modulation signal input terminal, one of a source and a drain of the fourth transistor is electrically connected to the first node, and another of the source and the drain of the fourth transistor is electrically connected to the second node; and a gate of the sixth transistor is electrically connected to the first node, one of a source and a drain of the sixth transistor is electrically connected to a first power supply signal input terminal, and another of the source and the drain of the sixth transistor is electrically connected to the pulse amplitude modulation module, wherein the duty cycle control module further comprises:

a fourteenth transistor, a gate of the fourteenth transistor is electrically connected to a second light-emitting control signal input terminal, one of a source and a drain of the fourteenth transistor is electrically connected to a second ramp signal input terminal, and another of the source and the drain of the fourteenth transistor is electrically connected to the third node, wherein the second ramp signal input terminal is configured to output a second ramp signal, and the second ramp signal has a waveform having a slope different from a slope of a waveform of the first ramp signal, wherein the first transistor and the fourteenth transistor are configured to selectively output the first ramp signal or the second ramp signal to the third node, and wherein, in a light-emitting phase of the display device, the first data signal input terminal is configured to output a first data signal, and a voltage of the first data signal is less than a voltage of the first ramp signal or the second ramp signal such that the sixth transistor is turned on and the light-emitting device emits light.

2. The display device according to claim 1, wherein the comparator comprises a third transistor and a fifth transistor, one of a source and a drain of the third transistor being electrically connected to the first level signal input terminal, another of the source and the drain of the third transistor being electrically connected to the first node, the third transistor being electrically connected to the second node, one of a source and a drain of the fifth transistor being electrically connected to the second level signal input terminal, another of the source and the drain of the fifth transistor being electrically connected to the first node, and a gate of the fifth transistor being electrically connected to the second node or the second level signal input terminal.

3. The display device according to claim 2, wherein the first transistor, the second transistor, the third transistor, the fourth transistor and the sixth transistor are all P-type transistors, the fifth transistor is an N-type transistor, and the gate of the fifth transistor is electrically connected to the second node.

4. The display device according to claim 1, wherein voltages of the first ramp signal and the second ramp signal vary linearly with time.

5. The display device according to claim 1, wherein the duty cycle control module is configured to reduce a light emission duty cycle under a condition that a grayscale corresponding to display data is within a first grayscale range.

6. The display device according to claim 1, wherein the pulse width modulation module is configured to switch a grayscale corresponding to display data by adjusting a light emission time under a condition that the grayscale is in a first grayscale range; the pulse amplitude modulation module is configured to switch a grayscale corresponding to display data by adjusting a current amplitude under a condition that the grayscale is within a second grayscale range.

7. The display device according to claim 1, wherein a slope of the first ramp signal or the second ramp signal is lower than a first slope value when the display device displays a picture having a brightness value less than a first brightness value.

8. The display device according to claim 1, wherein the display device further comprises a digital-to-analog converter configured for generating the first ramp signal and the second ramp signal;

the first ramp signal input terminal and the second ramp signal input terminal are electrically connected to the digital-to-analog converter.

* * * * *